United States Patent
Van Overveld

(10) Patent No.: US 6,614,446 B1
(45) Date of Patent: Sep. 2, 2003

(54) METHOD AND APPARATUS FOR COMPUTING A COMPUTER GRAPHICS IMAGE OF A TEXTURED SURFACE

(75) Inventor: Cornelis Wilhelmus Antonius Marie Van Overveld, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 489 days.

(21) Appl. No.: 09/616,736

(22) Filed: Jul. 14, 2000

(30) Foreign Application Priority Data

Jul. 20, 1999 (EP) .............................. 99202381

(51) Int. Cl.$^7$ ................................. G09G 5/00
(52) U.S. Cl. ....................... 345/582; 345/581
(58) Field of Search .................. 345/582–587, 345/419

(56) References Cited

U.S. PATENT DOCUMENTS

| | | | | |
|---|---|---|---|---|
| 5,446,833 A | * | 8/1995 | Miller et al. ................ | 345/585 |
| 5,680,531 A | * | 10/1997 | Litwinowicz et al. ....... | 345/473 |
| 5,751,927 A | * | 5/1998 | Wason ......................... | 345/419 |
| 5,760,783 A | * | 6/1998 | Migdal et al. .............. | 345/587 |
| 5,841,441 A | * | 11/1998 | Smith ........................ | 345/587 |
| 5,929,859 A | * | 7/1999 | Meijers ...................... | 345/419 |
| 6,049,337 A | * | 4/2000 | Van Overveld ............. | 345/582 |
| 6,215,496 B1 | * | 4/2001 | Szeliski et al. ............. | 345/419 |
| 6,229,549 B1 | * | 5/2001 | Smith ........................ | 345/419 |
| 6,256,038 B1 | * | 7/2001 | Krishnamurthy ............ | 345/419 |

FOREIGN PATENT DOCUMENTS

WO        WO9822911        5/1998        ......... G06T/15/10

* cited by examiner

*Primary Examiner*—Matthew C. Bella
*Assistant Examiner*—Anthony Blackman
(74) *Attorney, Agent, or Firm*—Russell Gross

(57) ABSTRACT

A pixel value for a pixel is computed in a texture mapped computer graphics image. Surface coordinates are computed that map to a location of intersection of a 3D surface with a line of sight from the pixel. A surface coordinate offset vector is computed that represents a change in the surface coordinates of the intersection, the change corresponding to displacement of the surface by an amount specified by a displacement map value for the surface coordinates. The pixel value is computed in the computer graphics image from a texture value defined for said surface coordinates offset by said offset vector.

8 Claims, 1 Drawing Sheet

Figure 1:
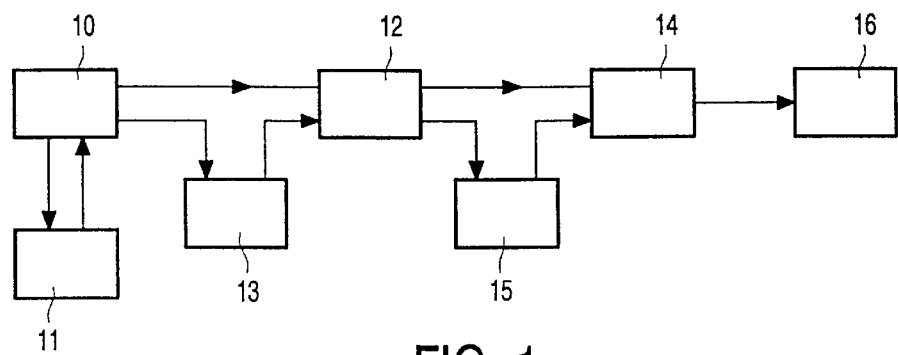

METHOD AND APPARATUS FOR COMPUTING A COMPUTER GRAPHICS IMAGE OF A TEXTURED SURFACE

The invention relates to a method of computing a pixel value for a pixel in a texture mapped computer graphics image.

Texture mapping and bump mapping are mapping techniques for increasing the realism of computer graphics images. These mapping techniques are used to create color patterns and visual effects of unevenness in an image part that shows a surface, which is modeled as a flat polygon in three-dimensional space. These mapping techniques use an approximation to compute the image. A two-dimensional map (the texture map or the bump map) is provided, for example as an array of values stored in computer memory. Each location on the surface is assigned to a location in the map. When the pixel value of a pixel in the image is computed, one computes which location on the surface is visible in the pixies and determines the pixel value from the value stored in the two dimensional map for the location in the map which is assigned to that location on the surface. In case of a texture map, a color value (e.g. RGB combination) from the map is used to compute a surface color. In case of a bump map, a local surface orientation is determined from the bump map and this orientation is used to compute visible reflections from the surface.

Texture mapping and bump mapping increase the sense of realism that is experienced when viewing the image. A further increase can be realized by including parallax effects. This is realized for example in PCT patent application Ser. No. 98/92911 (by the same inventor) which creates a parallax effects by combining information from two texture maps for one surface, where the two texture maps are offset to one another in a direction normal to the surface.

It is an object of the invention to provide a method and apparatus for generating computer graphics images with additional realism.

The method according to the invention is set forth in claim 1. According to the invention, the surface texture in a pixel is determined from the content of the texture map at a texture map location. The texture map location is determined by applying an offset to a location in the texture map that is assigned to the surface location which is visible in the pixel. The offset is determined from a surface height for the surface location, as determined from a displacement map. Thus, a parallax in the texture is simulated. The parallax corresponds to unevenness of the surface as described by the displacement map.

The parallax also depends on the current viewing direction relative to the local normal vector. So in order to compute the offset, both the surface height and the viewing parameters are taken into account.

Preferably, the computation of parallax from the displacement map is combined with computation of angular dependence of reflections (specular and/or diffuse reflections) and/or shadows cast from the unevenness described by the displacement map. The computation of parallax effect will automatically account for some effects of occlusion: hiding of certain surface details by other surface details.

The invention also relates to an apparatus with computer graphics capability that is structured and/or programmed to perform the method according to the invention.

Figure 2:
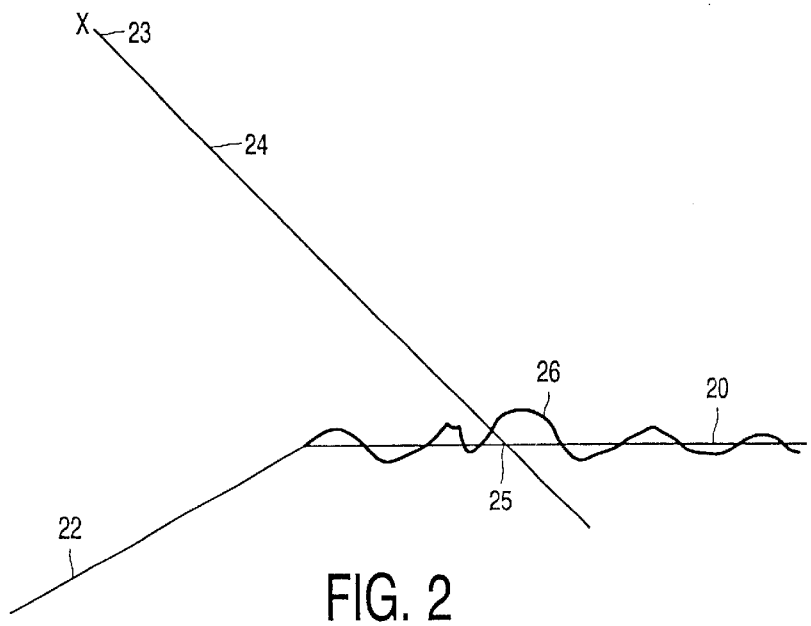
Figure 3:
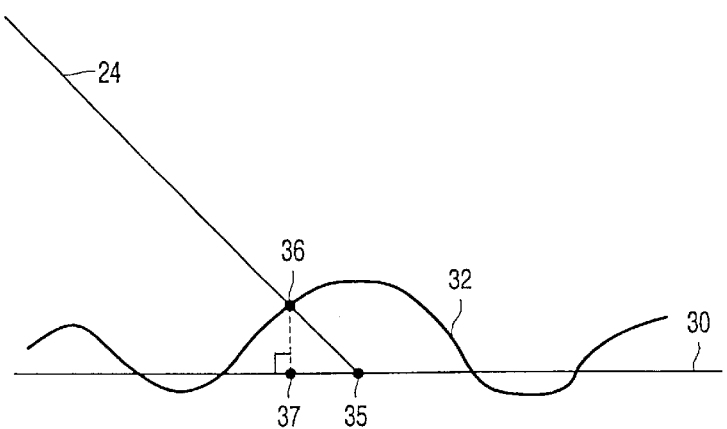

These and other advantageous aspects of the invention will be described by way of non-limitative example using the following figures, wherein FIG. 1 shows a computer graphic apparatus FIG. 2 shows an example of a two-dimensional cross-section of a three dimensional space FIG. 3 illustrates the parallax effect caused by height variations.

FIG. 1 shows a computer graphics apparatus. The apparatus contains a pixel control unit 10 coupled to a model memory 11. An output of the pixel control unit 10 is coupled to an offset generator 12 and a displacement map memory 13. The displacement map memory 13 is coupled to the offset generator 12. The offset generator 12 has an output coupled to a texture memory 15 and a pixel value generator 14. The texture memory 15 has an output coupled to the pixel value generator 14. The pixel generator has an output to a display unit 16, which also has an input to the pixel control unit 10.

In operation, the pixel control unit 10 visits a number of pixels. By way of example, the pixel control unit 10 successively visits spatially successive pixels along a scan line of an image. The pixel control unit 10 signals the location of the pixel being visited to the display unit 16, e.g. by means of a pixel clock that signals advance along the scan line.

FIG. 2 shows an example of a two-dimensional cross-section of a three dimensional space that contains an object described by model. The cross-section shows two surfaces 20, 22 in cross-section. In addition, a viewpoint 23 is shown and a line of sight 24 from the viewpoint 23 to one of the surfaces 20. The line of sight 24 intersects this surface 20 at a surface location 25.

A displacement map is provided at least for the first surface 20. The displacement map defines a height profile 26 for this surface 20. The height profile 26 corresponds for example to displacement of each surface location by a location dependent amount along the normal of the surface at that surface location.

The location dependent amount is specified for example by means of a function of two-dimensional coordinates. Values of this function for different coordinates may be stored as an array of values in the displacement map memory 13. The model specifies the function that is to be used for each surface 20, 22. The model also specifies a relation between on one hand two dimensional coordinates are used as arguments for the function and on the other hand surface coordinates of locations on the surface 20, 22. Thus, a function value is assigned to each location on the surface.

The pixel control unit 10 determines which modeled surface 20 is visible at a visited pixel. The pixel control unit 10 also determines the two-dimensional coordinates of the surface location 25 that is visible at the pixel. From this information, the pixel control unit 10 determines an address to retrieve the appropriate displacement map value from the displacement map memory 13. The pixel control unit 10 thereupon accesses the displacement map memory 13, to obtain a displacement map value for the visible surface 20 at the coordinates of the surface location 25. The pixel control unit 10 also determines the normal to the surface 20 at this surface location 25. The pixel control unit 10 signals an indication of the coordinates and the normal to the offset generator 14.

The offset generator 14 receives an indication of the visible surface 20 and the surface coordinates of the surface location. The offset generator 14 applies an offset to the surface coordinates.

The resulting surface coordinates and an indication of the modeled surface 20 that is visible are used to address the texture map memory 15. The texture map memory 15 stores texture map values that describe for example a color pattern of location dependent light reflected from the surface (optionally the texture map is also normal vector orientation dependent; in this case the normal vector is also used to address texture map memory 15). In response to addressing from the offset generator 12 the texture map memory 15 provides a texture value for the location 25 that is visible for at visited pixel.

The pixel value generator 14 uses the texture map value and the normal to the surface to compute the pixel value of the visited pixel. This pixel value is passed to the display unit 16, for display on a display screen at a pixel location defined by the visited pixel. Preferably, the display unit 16 stores the pixel value in a frame buffer (not shown) at a location determined by the coordinates of the visited pixel, for later display on a display screen.

As mentioned, the offset generator 14 applies an offset to the surface coordinates. The offset accounts for a parallax effect corresponding to height variations of the surface 20 as defined by the displacement map.

FIG. 3 illustrates the parallax effect caused by height variations. A surface 30 is shown in cross-section, with a height profile 32. A line of sight 34 intersects the surface 30 at a first surface location 35. It intersects the height profile 32 at a profile location 36. The profile location 36 corresponds to a second surface location 37, obtained by displacing the profile location 36 along the normal to the surface. Without parallax, the texture for the first surface location 35 would be visible along the line of sight 34. Due to parallax, the texture for the second surface location 37 will be visible along the line of sight 34. That is, the surface coordinate for which a texture value is obtained is offset from the surface of the coordinates of the first location 35 by a vector D, where $$D = h\, Pe$$

Here "h" is the displacement along the normal defined by the displacement map for the second location 37, and Pe is a projection onto the surface 30 of a normal vector "e" in the direction of the line of sight 34. In general, the offset will be small compared with the variation of the displacement "h" along the surface 30 and therefore a reasonable approximation of the parallax can be obtained by taking the displacement h for the first surface location 35 instead of that for the second surface location 37.

In any case, the offset does not need to be computed with extreme precision in order to create a convincing visual impression of an uneven surface. A convincing visual impression is created by this approximation, or similar approximations, because the approximation normally provides a parallax in the right direction and with an amplitude that is responsive to height variation.

The offset generator 14 applies offsets to the surface coordinates of visited pixels. The offset generator 14 determines the offset dependent on the displacement map height value h that is obtained 35 from the displacement map memory 13 for the first surface location 35 where the line of sight 34 from the visited pixel intersects the flat modeled surface 30. The offset generator 14 adds this offset to received coordinates of the first surface location 35. The offset generator 14 applies the resulting coordinates as an address to texture memory 15. Pixel value generator 16 uses the addressed content of texture memory 15 to generate a pixel value. Thus, the pixel value corresponds to a texture that is locally offset by the offset computed by the offset generator 14.

Preferably, the pixel control unit 10 computes the normal to the surface by interpolation of values of the normal for the corners of the surface, as is known for shading calculations such as Phong shading, so that the normal may vary over the surface. The interpolated normal that is used for computing reflected light intensity preferably is also used to compute the offset in the offset generator 14. Thus, there will be no visible jumps in parallax at the junctions between different surfaces that are used to model objects.

Of course, the implementation described above is merely an example of how the invention can be applied. Many variations are conceivable, such as implementation of the different units 10, 12, 14 in a suitably programmed computer, and/or implementation of one or more of the different memories 11, 13, 15 as different regions in a larger memory. Other variations include computing displacement map and/or texture values from a function instead of obtaining them from memory. Similarly, instead of using flat surfaces to model the shape of an object one may use curved surfaces, such as Bezier triangles or implicit surfaces as a model to compute the points of intersection, surface coordinates etc.

By accounting for parallax, some effect of occlusion (disappearance of some surface detail behind a different surface part) is automatically accounted for. If desired, a further computation of occlusion may be included to increase the experienced realism of the image.

Preferably, the application of an offset to suggest parallax is combined with computations to account for effects of unevenness such as the casting of shadows and/or surface orientation dependent reflection (preferably both diffuse and specular reflection). To a considerable extent, these computations use the same information about the surface (surface coordinates, normals, displacement maps) as the computation of parallax. Therefore, computation of parallax can be added to these computations without much computational overhead. When combined in a consistent way (i.e. using the same displacement map), the combination of the effects increases the experienced realism of surfaces.

What is claimed is:

1. A method of computing a pixel value for a pixel in a texture mapped computer graphics image, the method comprising defining a surface in a three dimensional space;

defining texture values and displacement map values as respective functions of surface coordinates;

defining a mapping of the surface coordinates to locations on the surface;

computing surface coordinates that map to a location of intersection of the surface with a line of sight from the pixel;

computing a surface coordinate offset vector that represents a change in the surface coordinates of said intersection, the change corresponding to displacement of the surface by an amount specified by the displacement map value for the surface coordinates;

computing a pixel value for the pixel in the computer graphics image from a texture value defined for said surface coordinates offset by said offset vector.

2. A method according to claim 1, also comprising computation of angular dependence of reflected light intensity from the surface, dependent on a surface orientation modified in correspondence with said displacement map values.

3. A method according to claim 2, wherein said displacement map value defined for said surface coordinates offset by said offset vector is used for computing angular dependence of the reflected light intensity.

4. A method according to claim 2, also comprising computation of shadows cast from unevenness of the surface in correspondence with said displacement map value.

5. A texture mapped computer graphics image generator comprising
- a surface model input for receiving model that defines a surface in a three dimensional space;
- a texture map memory for storing a texture map that defines texture values and displacement map values as respective functions of surface coordinates;
- a mapping input for receiving a mapping of the surface coordinates to locations on the surface;
- a processing circuit arranged for
- computing surface coordinates that map to a location of intersection of the surface with a line of sight from a pixel;
- determining a surface coordinate offset vector that represents a change in the surface coordinates of said intersection, the change corresponding to displacement of the surface by an amount specified by the displacement map value for the surface coordinates;
- determining a pixel value for the pixel in the computer graphics image from a texture value defined for said surface coordinates offset by said offset vector.

6. A generator according to claim 5, the processing circuit being arranged to determine an angular dependence of reflected light intensity from the surface, dependent on a surface orientation modified in correspondence with said displacement map values.

7. A generator according to claim 6, wherein said displacement map value defined for said surface coordinates offset by said offset vector is used for computing angular dependence of the reflected light intensity.

8. A generator according to claim 6, the processing circuit being arranged to compute an effect of shadows cast from unevenness of the surface in correspondence with said displacement map value.

* * * * *